Patented Aug. 18, 1925.

1,550,385

UNITED STATES PATENT OFFICE.

MOTOHIRO NAMBA, OF TOKYO, JAPAN, ASSIGNOR TO THE ASAHI GLASS COMPANY, LIMITED, OF TOKYO, JAPAN.

FERTILIZER.

No Drawing.   Application filed July 24, 1923.   Serial No. 653,563.

*To all whom it may concern:*

Be it known that MOTOHIRO NAMBA, a subject of the Empire of Japan, residing at No. 12 Awoyamatakagi-cho, Akasaka-ku, Tokyo, Japan, has invented certain new and useful Improvements in Fertilizers, of which the following is a specification.

This invention relates to stimulating agents of the plant growth by using colloidal magnesium silicate or colloidal magnesium antimonate having oxydase-like action. Such colloidal magnesium silicate or colloidal magnesium antimonate are securable by treating magnesium containing waste liquor from ammonia soda works or salt refineries with an aqueous solution of alkali silicate or alkali antimonate. The aim of this invention is to use more effective stimulating agents than any other known stimulating or catalytic manures.

Manganous sulphate, manganous chloride, potassium iodide, sodium fluoride, etc. have long been regarded as the most effective stimulating agents of the plant growth. These salts, however, being no nutrient, but rather belonging to toxic agent for the plant growth, do no injurious action to the plants only when they are used in minute quantities, but stimulate the physiological function of the plants.

These stimulating manures are easily water soluble simple salts, and they do not have oxydase-like action. And, as the stimulation of these simple salts is due to the action of the respective ions in dilute solutions, they react speedily with other substances, and the concentrations, quantities, and the method of application all require minute precautions to the respective plant, and it is by no means easy to obtain the estimated result, even with the same plant, according to the stage of its growth.

This invention, however, is to use the colloidal magnesium silicate or colloidal magnesium antimonate which have oxydase-like action, and such colloidal substance can be obtained by the treatment of the magnesium containing waste liquor from ammonia soda works or salt refineries, etc., precipitating magnesium silicate or magnesium antimonate according to the following equation:—

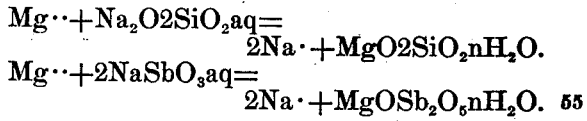

The precipitate of magnesium silicate or magnesium antimonate thus obtained are perfectly freed from electrolyte by washing and filtering by the dialysis method, and after mixing and grinding in the stirring tank, an effective colloidal magnesium silicate or colloidal magnesium antimonate are produced.

As the result of testing with various phenolic substances as a substrate, such as indophenol, benzidine, and pyrogallic acid, etc., and hydrogen-peroxide, I came to know that the colloidal magnesium silicate or colloidal magnesium antimonate have oxydase-like action. In the using of these colloidal magnesium silicate or colloidal magnesium antimonate as stimulating agents for the plant growth, the oxydase-like action activates the water in the soil, increases the absorption of water and nutrient for the plant, and at the same time, it also promotes the plant growth directly or indirectly as an oxygen carrier, by accelerating the oxidizing action and the supply of an active oxygen indispensable to the plant growth.

As the action of colloidal magnesium silicate or colloidal magnesium antimonate to other substances is very inactive like other colloidal substances, the colloidal magnesium silicate or colloidal magnesium antimonate prove the same effect in any concentration, in any quantity, and in any method of application, at any stage of the plant growth without any harmful action, as compared with the old stimulating or catalytic manures which increase the plant growth by mere stimulation of the physiological function of the plant. The application of the colloidal magnesium silicate or colloidal magnesium antimonate of my new invention, however, is quite simple, easy and infallible.

Besides the acceleration of the plant growth by the oxydase-like action, the colloidal magnesium silicate or colloidal magnesium antimonate give an effective action as other colloidal substances in the soil, although the quantities of application is very small, and even after losing their colloidal nature, their components are still efficacious by the supply of the nutrients of the plants, and stimulate their physiological functions.

In my pot, cylinder and field experiments with various kinds of plants, I have found the increase of production and improvement of the quality of their products, and yet I have never experienced any undesirable effect.

Not only the colloidal magnesium silicate or colloidal magnesium antimonate thus obtained or in any other processes, but also other colloidal substances containing one or more constituents of the plant, which have the oxydase-like action, can all be used for similar purposes.

Having now described my invention, what I claim as new and desire to secure by Letters Patent is as follows:—

A fertilizer containing colloidal magnesium antimonate.

In testimony whereof I have hereunto set my hand and affixed my signature.

MOTOHIRO NAMBA.